United States Patent
Chae et al.

(10) Patent No.: US 9,294,871 B2
(45) Date of Patent: Mar. 22, 2016

(54) ELECTRONIC MOBILE DEVICE

(71) Applicants: Junghoon Chae, Suwon (KR); Youngki Kim, Suwon (KR)

(72) Inventors: Junghoon Chae, Suwon (KR); Youngki Kim, Suwon (KR)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/294,280

(22) Filed: Jun. 3, 2014

(65) Prior Publication Data
US 2015/0148096 A1    May 28, 2015

(30) Foreign Application Priority Data
Nov. 25, 2013  (CN) .......................... 2013 1 0608188

(51) Int. Cl.
| | |
|---|---|
| *H04M 1/00* | (2006.01) |
| *H04W 4/00* | (2009.01) |
| *H04M 1/02* | (2006.01) |
| *H04B 5/00* | (2006.01) |
| *H01Q 1/38* | (2006.01) |
| *H01Q 7/00* | (2006.01) |

(52) U.S. Cl.
CPC ................. *H04W 4/008* (2013.01); *H01Q 1/38* (2013.01); *H01Q 7/00* (2013.01); *H04B 5/0081* (2013.01); *H04M 1/026* (2013.01); *H04M 1/0264* (2013.01); *H04M 1/0283* (2013.01)

(58) Field of Classification Search
CPC ........................................................ H01Q 7/06
See application file for complete search history.

(56) References Cited

U.S. PATENT DOCUMENTS

| | | | | |
|---|---|---|---|---|
| 2006/0152576 | A1* | 7/2006 | Kiessling | H04M 1/0256 348/14.01 |
| 2008/0245851 | A1* | 10/2008 | Kowalski | G06K 7/10178 235/375 |
| 2011/0065383 | A1* | 3/2011 | Frankland | H01Q 1/243 455/41.1 |
| 2012/0149314 | A1* | 6/2012 | Shimasaki | H01Q 1/2266 455/90.2 |
| 2013/0079069 | A1* | 3/2013 | Kwon | H01Q 1/243 455/575.5 |

FOREIGN PATENT DOCUMENTS

JP        2010130535 A  *  6/2010

\* cited by examiner

*Primary Examiner* — Edward Urban
*Assistant Examiner* — Mohammed Rachedine
(74) *Attorney, Agent, or Firm* — IPro, PLLC; Na Xu

(57) ABSTRACT

An electronic mobile device is disclosed. The electronic mobile device includes a housing including a plurality of sidewalls, a receiving space formed by the sidewalls, a slot formed in one of the sidewalls, and a non-conductive portion received in the slot. The non-conductive portion includes a non-metal body having a first surface facing the receiving space and a second surface opposed to the first surface. An antenna module is coupled with the housing, and the antenna module comprises an antenna coil locating on the first surface of the non-metal body.

5 Claims, 2 Drawing Sheets

ELECTRONIC MOBILE DEVICE

FIELD OF THE INVENTION

The present invention relates to electronic mobile devices, more particularly to a mobile device having an antenna coil positioned on non-conductive parts thereof.

DESCRIPTION OF RELATED ART

Near field communication (NFC) is a set of standards for smartphones and similar devices to establish radio communication with each other by touching them together or bringing them into proximity, usually no more than a few inches.

Present and anticipated applications include contactless transactions, data exchange, and simplified setup of more complex communications such as Wi-Fi. Communication is also possible between a NFC device and an unpowered NFC chip, called a "tag". NFC standards cover communications protocols and data exchange formats, and are based on existing radio-frequency identification (RFID) standards including ISO/IEC 14443 and FeliCa. Smartphones equipped with NFC can be paired with NFC Tags or stickers which can be programmed by NFC apps to automate tasks. These programs can allow for a change of phone settings, a text to be created and sent, an app to be launched, or any number of commands to be executed, limited only by the NFC app and other apps on the smartphone.

Related mobile device having an NFC coil generally has a metal frame to improve the strength of the mobile device. However, the metal frame forms a shield against the electromagnetic field generated by the NFC coil, which seriously affects the data transmission between the mobile device having the NFC coil and a target device.

On another hand, the mobile devices are designed to be thinner and thinner, and the NFC coils arranged therein are desired to occupy relatively smaller area in the mobile device. Due to the shield formed by the metal frame, the NFC coil is generally forced to be designed to occupy relatively greater area for ensuring the necessary power for data transmission. Thus the current design of the NFC module in mobile device cannot meet the requirements of small form factor.

Accordingly, an improved mobile device which can overcome the disadvantage described above is desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to exemplary embodiments.

Figure 1:
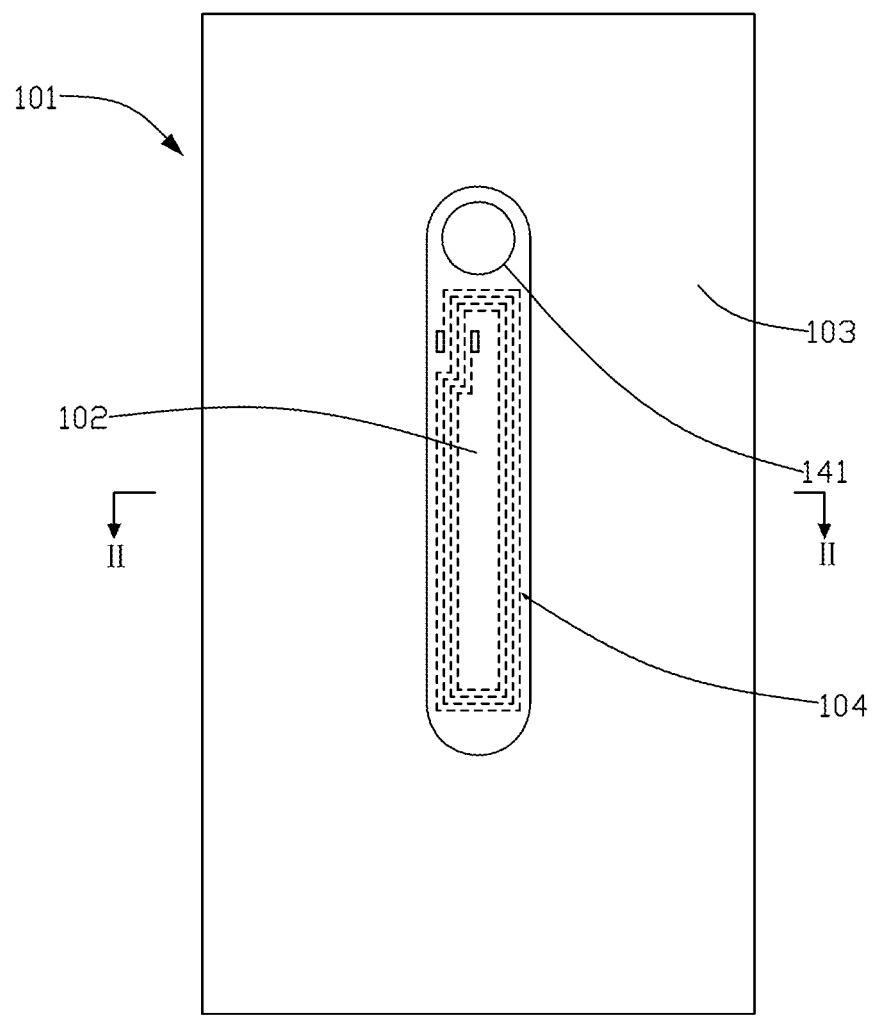
FIG. 1 is an illustration of an electronic mobile device in accordance with an exemplary embodiment of the present disclosure.
Figure 2:
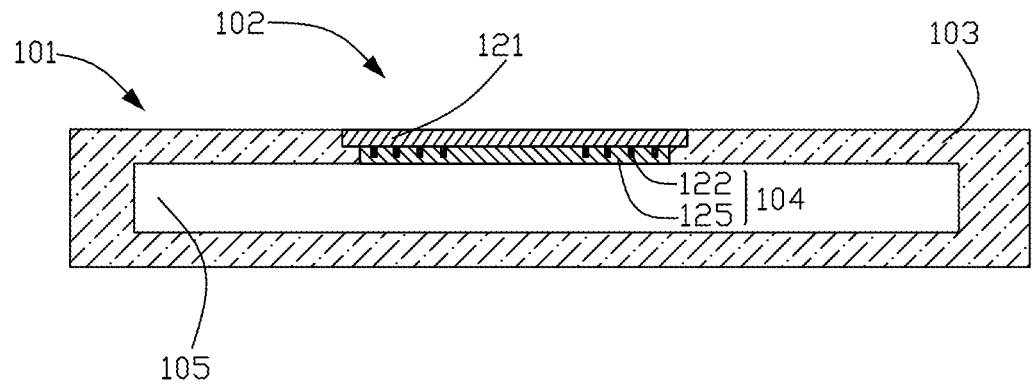
FIG. 2 is an enlarged cross-sectional view of the electronic mobile device taken along line II-II in FIG. 1.
Figure 3:
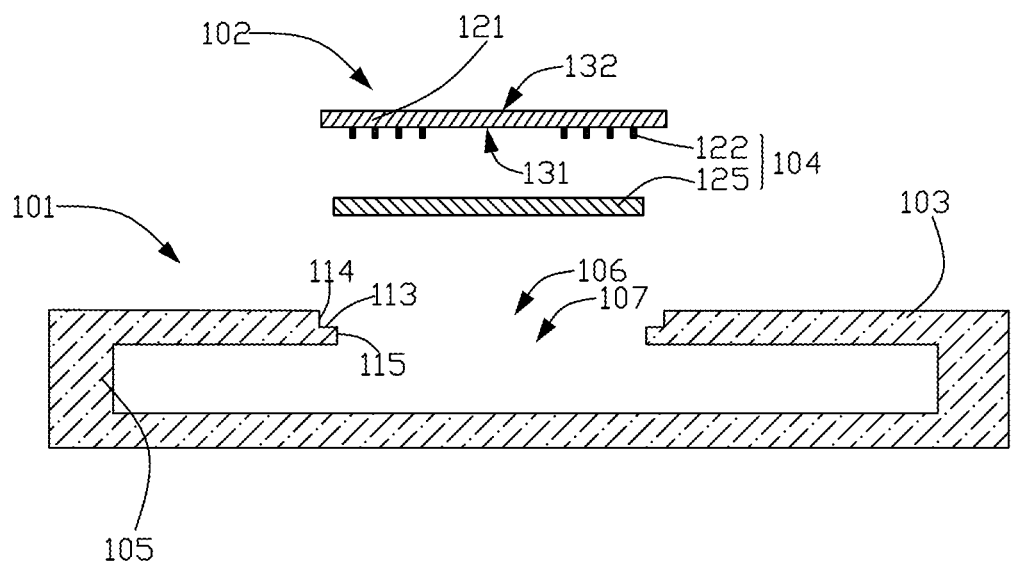
FIG. 3 is an exploded view of the electronic mobile device in FIG. 2.

Referring to FIGS. 1-3, an electronic mobile device 100 in accordance with an exemplary embodiment of the present disclosure may be a mobile phone, a tablet, or a portable multi-media player. The electronic mobile device 100 includes a housing 101, an antenna module 104 coupled with the housing 101, and other ordinary electrical components received in the housing 101. The other ordinary electrical components comprise a camera module, a screen, and a speaker, etc. In fact, the other ordinary components are the ones known to the persons with ordinary skills in the art. The housing 101 may be metallic or plastic. The housing 101 includes a plurality of sidewalls 103 and a non-conductive portion 102. The sidewalls 103 form a receiving space 105 for receiving the electrical components. Any selected one of the sidewalls 103 may define a slot 106, and the non-conductive portion 102 is accordingly received in the slot 106.

The non-conductive portion 102 includes a non-metal body 121 including a first surface 131 and a second surface 132 opposed to the first surface 131. The first surface 131 faces the receiving space 105 formed by the sidewalls 103.

The antenna module 104 is used for achieving the communication function of the mobile device 100, and includes an antenna coil 122 and a ferrite plate 125. The antenna coil 122 may be an NFC coil, or RFID (Radio Frequency Identification) coil, or a Bluetooth coil, or a ZigBee coil, or a Wi-Fi coil, or other kind of coil for transmitting data between the electronic mobile device and an external device. In this embodiment, the antenna coil 122 could be directly formed on the first surface of the non-metal body 121 by LDS (Laser-Direct-Structuring) or by pattern printing.

The ferrite plate 125 is used for converging the electromagnetic field near the antenna coil 122 to enhance the signal power of the antenna coil 122. The ferrite plate 125 connects to the first surface 131 of the non-metal body 121 and covers the antenna coil 122. It is understood that the ferrite plate 125 is an optional element used in the mobile device. In actual application, the ferrite plate 125 can be omitted if there's no conductive material nearby the antenna coil 122.

Optionally, the sidewall 103 includes a first inner side 114, a carrying surface 113 extending substantially vertically from the first inner side 114, and a second inner side 115 extending from the carrying surface 113 toward the receiving space. The first inner surface 114 is substantially vertical to the carrying surface 113, and is substantially parallel to the second inner side 115. The first inner side 114 and the carrying surface 113 cooperatively form the slot 106 for receiving the non-conductive portion 102. The second inner side 115 forms a receiving portion 107 communicated with the receiving space 105 and the slot 106. When the non-conductive portion 102 is received in the slot 106, an edge of the first surface 131 of the non-metal body 121 abuts against the carrying surface 113.

When the non-conductive portion 102 is received in the slot 106, the ferrite plate 125 locates in the receiving portion 107. In this embodiment, the size of the ferrite plate 125 is smaller than that of the non-metal body 121. Thus, an edge of the first surface 131 of the non-metal body 121 is not covered by the ferrite plate 125, and the edge of the first surface of the non-metal body 121 directly abuts against the carrying surface 113.

Optionally, the electrical components comprise a camera module, and the non-conductive portion 102 is the decorative plate of the camera module on the housing 101. In this case, the non-metal body 121 includes a first through hole 141 for exposing the camera module.

Optionally, the electrical components comprise a button assembly having a button base and a button on the button base. In this case, the non-conductive portion is the button base on the housing, and the antenna coil locates on a surface of the button base toward the inside of the housing.

Optionally, the non-conductive portion may be the logo decoration of the mobile device, or other non-conductive decorative plate.

The improved electronic mobile device includes an antenna module having an antenna coil locating on the non-conductive portion thereof, which effectively reduces the influence of the shield to the electromagnetic field nearby the antenna coil, and improves the communication power of the device. And by the configuration described above, the antenna coil has an area smaller than 1000 mm$^2$.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic mobile device, comprising:
   a housing including a plurality of sidewalls, a receiving space formed by the sidewalls, a slot formed in one of the sidewalls, and a non-conductive portion received in the slot, the non-conductive portion including a non-metal body having a first surface facing the receiving space and a second surface opposed to the first surface;
   an antenna module coupled with the housing, the antenna module comprising an antenna coil locating on the first surface of the non-metal body;
   the antenna module further including a ferrite plate connecting with the first surface and covering the antenna coil;
   the sidewall including a first inner side, a carrying surface extending substantially vertically from the first inner side for forming the slot cooperatively with the first inner side, a second inner side extending from the carrying surface toward the receiving space for forming a receiving portion communicated with the slot and the receiving space, the second inner side abuts against the ferrite plate and an edge of the first surface of the non-metal body abuts against the carrying surface.

2. The electronic mobile device as claimed in claim 1 further including an electrical component, wherein at least a portion of the electrical component exposes out of the non-conductive portion of the housing.

3. The electronic mobile device as claimed in claim 2, wherein the electrical component is a camera module, and the non-metal body of the non-conductive portion includes a through hole for exposing the camera module.

4. The electronic mobile device as claimed in claim 2, wherein the electrical component is a button assembly having a button base and a button on the button base, and the non-conductive portion is the button base on the housing, and the antenna coil locates on a surface of the button base toward the inside of the housing.

5. The electronic mobile device as claimed in claim 1, wherein the antenna coil is selected from the near-filed-communication coil, the radio-frequency-identification coil, the Bluetooth coil, the ZigBee coil, and the Wi-Fi coil.

\* \* \* \* \*